(12) United States Patent
Shuchart et al.

(10) Patent No.: US 6,531,427 B1
(45) Date of Patent: *Mar. 11, 2003

(54) REDUCING ALUMINUM COMPOUND PRECIPITATION FOLLOWING SUBTERRANEAN FORMATION ACIDIZING

(75) Inventors: Chris E. Shuchart, Duncan, OK (US); Rick D. Gdanski, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/587,821

(22) Filed: Jan. 11, 1996

Related U.S. Application Data

(63) Continuation of application No. 08/154,822, filed on Nov. 18, 1993, now abandoned.

(51) Int. Cl.[7] .............................. C09K 3/00; E21B 43/27
(52) U.S. Cl. ...................... 507/267; 507/269; 507/933; 166/300; 166/307
(58) Field of Search .................. 507/267, 933, 507/269; 166/300, 307

(56) References Cited

U.S. PATENT DOCUMENTS

| | | | | |
|---|---|---|---|---|
| 2,175,095 A | * | 10/1939 | Stoesser | 166/307 |
| 2,294,078 A | * | 8/1942 | Dow et al. | 166/281 |
| 2,838,116 A | * | 6/1958 | Clark et al. | 166/280 |
| 3,150,058 A | | 9/1964 | Haslam | 210/58 |
| 3,294,689 A | | 12/1966 | Pierce | 252/82 |
| 3,343,599 A | * | 9/1967 | Eddins et al. | 166/294 |
| 3,404,734 A | * | 10/1968 | Raifsnider et al. | 166/294 |
| 3,684,733 A | * | 8/1972 | Bannister et al. | 252/315.1 |
| 3,828,854 A | * | 8/1974 | Templeton et al. | 166/307 |
| 3,885,630 A | | 5/1975 | Richardson | 166/307 |
| 3,889,753 A | | 6/1975 | Richardson | 166/307 |
| 3,923,100 A | * | 12/1975 | Bellos et al. | 166/294 X |
| 4,090,563 A | | 5/1978 | Lybarger et al. | 166/307 |
| 4,122,896 A | * | 10/1978 | Scheurman et al. | 166/307 X |
| 4,151,098 A | | 4/1979 | Dill et al. | 252/8.55 C |
| 4,151,879 A | * | 5/1979 | Thomas | 166/307 |
| 4,213,866 A | | 7/1980 | Ashby et al. | 252/8.55 C |
| 4,304,676 A | | 12/1981 | Hall | 252/8.55 C |
| 4,548,732 A | | 10/1985 | Scheuerman et al. | 252/8.55 C |
| 4,552,672 A | * | 11/1985 | Walker | 507/240 |
| 4,561,503 A | | 12/1985 | Wong | 166/307 |
| 4,574,050 A | * | 3/1986 | Crowe et al. | 507/260 |
| 4,580,633 A | * | 4/1986 | Watkins et al. | 507/234 X |
| 4,595,517 A | | 6/1986 | Abadi | 252/82 |
| 4,599,182 A | | 7/1986 | Young et al. | 252/8.55 C |
| 4,624,795 A | * | 11/1986 | Dawson et al. | 507/205 |
| 4,646,835 A | * | 3/1987 | Watkins et al. | 166/295 |
| 4,698,168 A | | 10/1987 | Briggs | 252/8.553 |
| 4,739,833 A | * | 4/1988 | Watanabe et al. | 166/300 |
| 4,888,121 A | | 12/1989 | Dill et al. | 252/8.553 |
| 4,949,790 A | | 8/1990 | Dill et al. | 166/307 |
| 5,039,434 A | * | 8/1991 | Watkins et al. | 507/234 |
| 5,126,059 A | * | 6/1992 | Williamson | 507/241 |
| 5,529,125 A | * | 6/1996 | DiLullo Arias et al. | 166/307 |

FOREIGN PATENT DOCUMENTS

| | | |
|---|---|---|
| GB | 2 071 737 A | 9/1981 |
| GB | 2 177 145 A | 1/1987 |

OTHER PUBLICATIONS

SPE Paper No. 23812 entitled *"Identification of Aluminum Scale with the Aid if Synthetically Produced Basic Aluminum Fluoride Complexes"* by Chris E. Shuchart and Syed A. Ali. (1993).

* cited by examiner

*Primary Examiner*—Philip Tucker
(74) *Attorney, Agent, or Firm*—Robert A. Kent; Clifford C. Dougherty, III

(57) ABSTRACT

Methods and compositions for reducing the precipitation of aluminum compounds following the contact of an aluminum containing subterranean formation with an acid solution containing hydrofluoric acid are provided. In accordance with the methods, a hydroxy carboxylic acid is combined with the hydrofluoric acid solution and the subterranean formation is contacted with the resulting acid solution.

25 Claims, No Drawings

REDUCING ALUMINUM COMPOUND PRECIPITATION FOLLOWING SUBTERRANEAN FORMATION ACIDIZING

This application is a continuation of application(s) Ser. No. 08/154,822 filed on Nov. 18, 1993 now abandoned.

BACKGROUND OF THE INVENTION

1. Field of the Invention

The present invention relates generally to methods and compositions for acidizing oil and gas wells, and more particularly, to improved methods and compositions for acidizing aluminum and silicate containing formations with reduced aluminum compound precipitation.

2. Description of the Prior Art

In well acidizing procedures for increasing the permeability of subterranean formations containing aluminum and silicates, e.g., sandstone, aqueous acid solutions containing hydrofluoric acid are often utilized. The hydrofluoric acid reacts with aluminum and silicate materials in the formations including clays and feldspars. A common problem involved in such acidizing procedures is the precipitation of reaction products, principally basic aluminum and aluminum-fluoride compounds, many of which occur almost immediately upon the spending of the acid solution and the elevation of the solution pH to a value between 2 and 3.

In addition to the immediate precipitation problems, precipitation can also occur after the hydrofluoric acidizing treatment is completed. This later precipitation has been called "alumino-silicate scaling" and is believed to be caused by spent hydrofluoric acid solution in the formation subsequently mixing with formation brine whereby the pH is caused to increase which in turn causes the precipitation.

Thus, there is a need for improved methods and hydrofluoric acid compositions whereby the precipitation of aluminum compounds following the acidizing of aluminum containing subterranean formations is reduced.

SUMMARY OF THE INVENTION

By the present invention, methods and compositions for acidizing aluminum containing subterranean formations without substantial aluminum compound precipitation are provided which meet the needs mentioned above and overcome the shortcomings of the prior art. The methods of the invention basically comprise including one or more hydroxy carboxylic acids in the hydrofluoric acid solution to be used in the acidizing procedure in an amount in the range of from about 0.2% to about 10% by weight of the resulting solution. The hydroxy carboxylic acid or acids function as a buffering agent in the acid solution which delays the increase in pH and the onset of precipitation. In addition, the hydroxy carboxylic acid or acids function as a chelating agent for aluminum and aluminum-fluoride cations which form the basic compounds that precipitate. The compositions of the invention are basically comprised of water, hydrofluoric acid and at least one hydroxy carboxylic acid.

It is, therefore, a general object of the present invention to provide methods and compositions for reducing the precipitation of aluminum compounds following the acidizing of aluminum containing subterranean formations with hydrofluoric acid solutions.

Other objects, features and advantages of the invention will be readily apparent to those skilled in the art upon a reading of the description of preferred embodiments which follows.

DESCRIPTION OF PREFERRED EMBODIMENTS

In carrying out acidizing procedures for increasing the permeability of subterranean well formations whereby hydrocarbons more readily flow from the formations to well bores penetrating them, aqueous acid solutions are commonly utilized. The aqueous acid solutions have included hydrochloric acid, hydrofluoric acid, formic acid, acetic acid and various mixtures of such acids.

In acidizing formations which are made up of aluminum and silicate materials including clays and feldspars, e.g., sandstone formations, aqueous acid solutions containing hydrofluoric acid have been utilized. In addition to hydrofluoric acid, the aqueous acid solutions have often included hydrochloric acid and have sometimes included acetic acid. Such acid solutions have generally contained hydrofluoric acid in an amount in the range of from about 0.5% to about 6% by weight of solution and hydrochloric acid in an amount in the range of from about 5% to about 15% by weight of solution. When acetic acid has been included, it has been present in an amount of from about 1% to about 10% by weight of the resulting acid solution.

A typical sandstone formation acidizing fluid has been comprised of water, hydrofluoric acid in an amount in the range of from about 1.5% to about 3% by weight of the acid solution and hydrochloric acid in an amount in the range of from about 12% to about 13.5% by weight of the acid solution. Such aqueous acid solutions are typically prepared by adding ammonium bifluoride to a 15% by weight aqueous hydrochloric acid solution. As is well understood by those skilled in the art, the acid solutions typically also include various additives such as surfactants, corrosion inhibitors, iron control agents, mutual solvents and the like.

Retarded aqueous hydrofluoric acid compositions have also been utilized for dissolving subterranean formation materials. Such compositions form temporary fluoride complexes or otherwise delay the formation of hydrofluoric acid whereby the reaction rate of the hydrofluoric acid with formation materials is retarded. For example, U.S. Pat. No. 4,304,676 issued on Dec. 8, 1981 to Hall describes retarded aqueous hydrofluoric acid compositions comprised of water, a mineral acid, e.g., hydrochloric acid, a fluoride compound which is a source of hydrofluoric acid in an acidic environment, e.g., ammonium bifluoride, and an aluminum compound which produces aluminum III ions, e.g., aluminum chloride. The aluminum III ions form aluminum fluoride complexes which retard the formation of hydrofluoric acid in the aqueous composition.

As mentioned above, a common problem involved in sandstone acidizing with aqueous acid solutions containing hydrofluoric acid, both retarded and non-retarded, has been the precipitation of reaction products. The precipitation occurs both immediately upon the spending of the acid solution when the pH increases to values between 2 and 3, and later when spent acid solution remaining in the acidized formation is contacted by water produced from the formation. By the present invention, such precipitation is reduced or prevented by including a hydroxy carboxylic acid in the acidizing solution.

It has been determined that the aluminum compounds that precipitate from acid solutions containing hydrofluoric acid when the solutions are utilized to acidize aluminum containing subterranean formations are aluminum hydroxide and aluminum fluoride hydroxide. Such basic aluminum compounds can precipitate beginning at pH values between 2 and 3, and the alumino-silicate scale formed in subterranean formations and on well components is comprised of a mixture of silica gel and the above mentioned basic aluminum compounds.

When one or more hydroxy carboxylic acids are included in an aqueous hydrofluoric acid solution utilized for acidizing aluminum containing formations, e.g., sandstone formations, the hydroxy carboxylic acid or acids function as buffering agents which delay the pH increase of the acid solution and the precipitation of the basic aluminum compounds. In addition, the hydroxy carboxylic acid or acids function as chelating agents whereby they coordinate to aluminum and aluminum fluoride cations in solution and prevent or reduce the formation of the basic compounds which precipitate.

Thus, in accordance with the methods of the present invention, at least one hydroxy carboxylic acid is included in the aqueous acid solution containing hydrofluoric acid to be utilized for acidizing an aluminum containing subterranean formation. Generally, the hydroxy carboxylic acid or acids are added to the solution in an amount in the range of from about 0.2% to about 10% by weight of the resulting acid solution. The presence of the hydroxy carboxylic acid or acids in an amount within the above range buffers the acid solution and coordinates the aluminum and aluminum fluoride therein to a degree that aluminum compound precipitation is substantially reduced or prevented.

Preferred hydroxy carboxylic acids for use in accordance with this invention are α-hydroxy carboxylic acids. The most preferred such acids are those selected from the group consisting of citric acid, tartaric acid, malic acid, lactic acid and hydroxyacetic (glycolic) acid. Of the foregoing acids, citric acid and tartaric acids are the most effective, and are included in an aqueous acid solution containing hydrofluoric acid in an amount in the range of from about 0.25% to about 5% by weight of the resulting solution. Citric acid is the most effective hydroxy carboxylic acid for use in accordance with this invention.

In a typical sandstone acidizing treatment in accordance with the present invention, the formation to be treated is first preflushed with an aqueous solution of ammonium chloride or hydrochloric acid or both. Following the preflush, the aqueous acid solution containing hydrofluoric acid, a hydroxy carboxylic acid and preferably hydrochloric acid, is introduced into and reacted with the sandstone formation. After the acidizing reaction has been completed whereby the permeability of the formation has been increased, the formation is overflushed with an aqueous solution of ammonium chloride, hydrochloric acid or both. In such treatments, it is preferred that in addition to the hydrofluoric acid solution used, both the preflush and overflush solutions include one or more hydroxy carboxylic acids in an amount in the range of from about 0.2% to about 10% by weight of the resulting preflush or overflush solutions.

The improved compositions of this invention for acidizing an aluminum containing subterranean formation without substantial aluminum compound precipitation are basically comprised of water, hydrofluoric acid, and at least one hydroxy carboxylic acid present in an amount in the range of from about 0.2% to about 10% by weight of the composition.

A preferred composition is comprised of water, hydrofluoric acid present in an amount in the range of from about 0.1% to about 6% by weight of said composition and a hydroxy carboxylic acid present in an amount in the range of from about 0.2% to about 10% by weight of the composition.

Another preferred such composition is comprised of water, hydrofluoric acid present in an amount in the range of from about 0.25% to about 3% by weight of the composition, hydrochloric acid present in an amount in the range of from about 5% to about 15% by weight of the composition, and at least one hydroxy carboxylic acid present in an amount in the range of from about 1% to about 5% by weight of the composition.

In order to further illustrate the methods and compositions of this invention and facilitate a clear understanding thereof, the following examples are given.

EXAMPLE 1

Aqueous solutions containing aluminum fluoride cation ($AlF^{2+}$) with and-without acetic acid and hydroxyacetic acid were prepared. The solutions were formed by combining aluminum chloride ($AlCl_3$) and ammonium bifluoride ($NH_4HF_2$) in an aqueous solution to give an overall aluminum concentration of about 0.58 molar and a fluoride to aluminum ratio of 1.0. The resulting solutions were titrated at about 90° C. with a base (NaOH). The base requirements expressed in hydroxyl to aluminum (OH/Al) molar ratios and the solution pH values at precipitation were determined. The amount of base consumed without precipitation indicates if the organic acids tested reduce precipitation, and which organic acid provides the most reduction in precipitation. The results of these titration tests are set forth in Table I below.

TABLE I

Titrations of Solutions Containing 0.58 M Aluminum, 0.58 M Fluoride and Acetic and Hydroxyacetic acids

| Organic Acid | Acid to Aluminum Molar Ratio | Precipitation Point pH | OH/Al Molar Ratio |
|---|---|---|---|
| none | 0 | 2.46 | 0.31 |
| none | 0 | 2.05 | 0.35 |
| acetic | 1.06 | 2.40 | 0.89 |
| acetic | 1.99 | 3.02 | 0.99 |
| hydroxyacetic | 1.04 | 3.29 | 1.81 |
| hydroxyacetic | 2.11 | 5.90 | 4.06 |

From Table I it can be seen that both acetic acid and hydroxyacetic acid reduce aluminum compound precipitation and that hydroxyacetic acid is much more effective than acetic acid.

EXAMPLE 2

Additional solutions containing various compounds were prepared in accordance with the procedure set forth in Example 1 above. As in Example 1, the solutions had overall aluminum and fluoride concentrations of about 0.58 molar each. In addition, the organic acid to aluminum ratio in the solutions ranged from about 0.4 to about 2.0. The solutions were titrated as indicated in Example 1 and the hydroxyl to aluminum ratios and pH values at precipitation were determined. The results of these tests are set forth in Table II below.

TABLE II

Titration of Solutions Containing 0.58 M
Aluminum, 0.58 M Fluoride and Other Compounds

| Compound | Compound/Aluminum molar ratio | Precipitation Point pH | OH/Al molar ratio |
|---|---|---|---|
| None | 0 | 2.11 | 0.34 |
| Acetic acid | 1.1 | 2.40 | 0.84 |
| Acetic acid | 2.0 | 3.02 | 0.96 |
| Glutaric acid | 1.0 | 2.53 | 1.00 |
| Hydroxyacetic acid | 0.5 | 2.63 | 1.14 |
| Hydroxyacetic acid | 1.0 | 3.29 | 1.81 |
| Hydroxyacetic acid | 2.1 | 5.99 | 4.10 |
| 80% Hydroxyacetic (20% Methanol) | 0.5 | 2.64 | 1.07 |
| 80% Hydroxyacetic (20% Methanol) | 1.0 | 3.01 | 1.88 |
| 50% acetic and 50% Hydroxyacetic acid mixture | 1.0 | 3.06 | 1.44 |
| Lactic acid | 1.0 | 3.10 | 1.76 |
| Mandelic acid | 1.0 | 2.03 | 1.02 |
| Malic acid | 0.4 | 3.01 | 1.68 |
| Malic acid | 1.0 | 7.60 | 4.35 |
| Tartaric acid | 0.4 | 3.08 | 1.92 |
| Tartaric acid | 1.0 | 5.93 | 3.63 |
| Citric acid | 0.4 | 3.25 | 2.04 |
| m-Hydroxybenzoic acid | 0.5 | 2.42 | 0.78 |
| Catechol | 0.5 | 2.08 | 0.41 |
| Glycine | 1.0 | 2.61 | 0.31 |

As shown by the above test data, basic aluminum fluoride complexes can precipitate from spent HF acid solutions when the pH increases to about 2.0 which corresponds to a hydroxyl to aluminum ratio of about 0.3. The use of one equivalent of acetic acid per aluminum can delay the onset of precipitation to a pH of about 2.4 corresponding to a hydroxyl to aluminum ratio of 0.84. Increasing the acetic acid content to two equivalents provides only a modest improvement in maintaining aluminum in solution.

Glutaric acid, a dicarboxylic acid, gave only slightly better results than acetic acid as a result of its not including a hydroxyl group to provide enhanced aluminum coordination.

The test data shows that hydroxyacetic acid is much more effective than acetic acid in providing a buffering effect as well as in coordinating to the aluminum fluoride cationic complex. That is, precipitation at one equivalent of hydroxyacetic acid per aluminum did not occur until a pH of 3.29 and a 1.81 hydroxyl to aluminum ratio.

Lactic acid which is hydroxyacetic acid substituted with a methyl group is about as effective as hydroxyacetic acid. Mandelic acid which is hydroxyacetic acid substituted with a phenyl group is less soluble, and thus, less effective than hydroxyacetic acid.

Malic acid and tartaric acid, both hydroxy dicarboxylic acids, were also tested. The structure of malic acid is equivalent to attaching acetic and glycolic acids together while tartaric acid can be thought of as diglycolic acid. As shown by the data in Table II, both malic acid and tartaric acid are much more effective in preventing aluminum precipitation than hydroxyacetic acid. As low as 0.4 equivalents of malic and tartaric acids are as effective as one equivalent of hydroxyacetic acid. As shown, tartaric acid is slightly better than malic acid at a concentration of 0.4 equivalent while the reverse is true at one equivalent.

Citric acid, a hydroxy tricarboxylic acid, is somewhat more effective than tartaric acid.

M-hydroxybenzoic acid which was not fully soluble at room temperature, but which dissolved upon heating, functioned at 0.5 equivalent similarly to one equivalent of acetic acid. Catechol and glycine were ineffective in preventing aluminum compound precipitation.

Thus, the test results given in Table II indicate that a hydroxy carboxylic acids reduce aluminum compound precipitation more effectively than other carboxylic acids. The hydroxy group of the hydroxy carboxylic acids provides additional coordination to aluminum and aluminum fluoride cations thereby maintaining the cations in solution and reducing precipitation.

EXAMPLE 3

Samples of a number of the titrated solutions formed in the tests of Example 2 were examined by $^{19}F$ Nuclear Magnetic Resonance (NMR) spectroscopy to determine the extent of coordination to aluminum fluoride cation ($AlF^{2+}$) achieved by the various acids tested. That is, approximately 2 ml samples were removed by pipet and stored in glass vials at room temperature until their $^{19}F$ NMR spectra could be obtained. The $^{19}F$ spectras were obtained on a GE 400 MHz NMR spectrometer at room temperature using 10 mm glass tubes. The fluoride nuclei were observed at 376.5 MHz. Spectral Analysis (SPAN), a deconvolution tool, was employed to line fit the NMR peaks, thus providing accurate integration of the signals.

The results of the $^{19}F$ NMR examinations showed that acetate coordinates to aluminum fluoride cation to a small extent while the hydroxy carboxylic acids of the present invention result in greatly enhanced coordination.

Thus, the present invention is well adapted to attain the ends and advantages mentioned as well as those which are inherent therein. While numerous changes may be made by those skilled in the art, such changes are encompassed within the spirit of this invention as defined by the appended claims.

What is claimed is:

1. A method of acidizing an aluminum containing sandstone formation without substantial aluminum fluoride complexes precipitation comprising:
   contacting said formation with a preflush solution including water and at least one hydroxy carboxylic acid, said hydroxy carboxylic acid being present in said preflush solution in an amount in the range of from 2.1% to about 10% by weight of said preflush solution; and
   after contacting said formation with said preflush solution, contacting said formation with an acidizing composition including water, hydrofluoric acid and at least one hydroxy carboxylic acid, said hydroxy carboxylic acid being present in said acidizing composition in an amount in the range of from 2.1% to about 10% by weight of said acidizing composition.

2. The method of claim 1 wherein said hydroxy carboxylic acid present in said preflush solution and said hydroxy carboxylic acid present in said acidizing composition are each at least one acid selected from the group consisting of citric acid, tartaric acid, malic acid, lactic acid and hydroxyacetic acid.

3. The method of claim 2 wherein said hydroxy carboxylic acid present in said preflush solution and said hydroxy carboxylic acid present in said acidizing composition are each at least one acid selected from the group consisting of malic acid, lactic acid and hydroxyacetic acid.

4. The method of claim 3 wherein said hydroxy carboxylic acid present in said preflush solution and said hydroxy carboxylic acid present in said acidizing composition are each hydroxyacetic acid.

5. A method of acidizing an aluminum containing sandstone formation without substantial aluminum fluoride complexes precipitation comprising:

contacting said formation with an acidizing composition including water, hydrofluoric acid and at least one hydroxy carboxylic acid, said hydroxy carboxylic acid being present in said acidizing composition in an amount in the range of from 2.1% to about 10 by weight of said acidizing composition; and after contacting said formation with said acidizing composition, contacting said formation with an overflush solution including water and at least one hydroxy carboxylic acid, said hydroxy carboxylic acid being present in said overflush solution in an amount in the range of from 2.1% to about 10% by weight of said overflush solution.

6. The method of claim 5 wherein said hydroxy carboxylic acid present in said acidizing composition and said hydroxy carboxylic acid present in said overflush solution are each at least one acid selected from the group consisting of citric acid, tartaric acid, malic acid, lactic acid and hydroxyacetic acid.

7. The method of claim 6 wherein said hydroxy carboxylic acid present in said acidizing composition and said hydroxy carboxylic acid present in said overflush solution are each at least one acid selected from the group consisting of malic acid, lactic acid and hydroxyacetic acid.

8. The method of claim 7 wherein said hydroxy carboxylic acid present in said acidizing composition and said hydroxy carboxylic acid present in said overflush solution are each hydroxyacetic acid.

9. The method of claim 5 wherein said acidizing composition further includes hydrochloric acid.

10. The method of claim 5 wherein both said acidizing composition and said overflush solution further include hydrochloric acid.

11. The method of claim 5 wherein said acidizing composition further includes hydrochloric acid.

12. The method of claim 5 wherein both said preflush solution and said acidizing solution further include hydrochloric acid.

13. A method of acidizing an aluminum containing sandstone formation without substantial aluminum fluoride complexes precipitation comprising contacting the formation with an acidizing composition including:

water;

hydrofluoric acid; and at least one hydroxy carboxylic acid present in an amount in the range of from 2.1% to about 10% by weight of said acidizing composition, said hydroxy carboxylic acid being at least one acid selected from the group consisting of malic acid, lactic acid and hydroxyacetic acid.

14. The method of claim 13 wherein said hydroxy carboxylic acid is hydrochloric acid.

15. The method of claim 14 wherein said hydrochloric acid is present in said acidizing composition in an amount in the range of from 2.1% to 8.6% by weight of said composition.

16. The method or claim 13 wherein said hydroxy carboxylic acid is malic acid.

17. The method of claim 16 wherein said malic acid is present in said acidizing composition in an amount in the range of from 2.9% to 7.2% by weight of said acidizing composition.

18. The method of claim 13 wherein said hydroxy carboxylic acid is lactic acid.

19. The method of claim 13 wherein said hydrofluoric acid is present in said acidizing composition in an amount in the range of from about 0.1% to about 6% by weight or said composition.

20. The method of claim 19 wherein said acidizing composition further includes hydrochloric acid present in said acidizing composition in an amount in the range of from about 5% to about 15% by weight of said composition.

21. The method of claim 13 wherein said acidizing composition further includes hydrochloric acid.

22. The method of claim 21 wherein said hydrochloric acid is present in said acidizing composition in an amount in the range of from about 5% to about 15% by weight of said composition.

23. A method of acidizing an aluminum containing sandstone formation without substantial aluminum fluoride complexes precipitation comprising contacting the formation with an acidizing composition including:

water;

hydrofluoric acid present in an amount in the range of from about 0.1% to about 6% by weight of said composition;

at least one hydroxy carboxylic acid present in an amount in the range of from 2.1% to about 10% by weight of said acidizing composition; and hydrochloric acid present in an amount in the range of from about 5% to about 15% by weight of said composition.

24. A method of acidizing an aluminum containing sandstone formation without substantial aluminum fluoride complexes precipitation comprising contacting the formation with an acidizing composition including:

water;

hydrochloric acid;

hydrofluoric acid; and at least one hydroxy carboxylic acid present in an amount in the range of from 2.1% to about 10% by weight of said acidizing composition.

25. The method of claim 24 wherein said hydrochloric acid is present in said acidizing composition in an amount in the range of from about 5% to about 15% by weight of said composition.

* * * * *